Patented Dec. 7, 1943

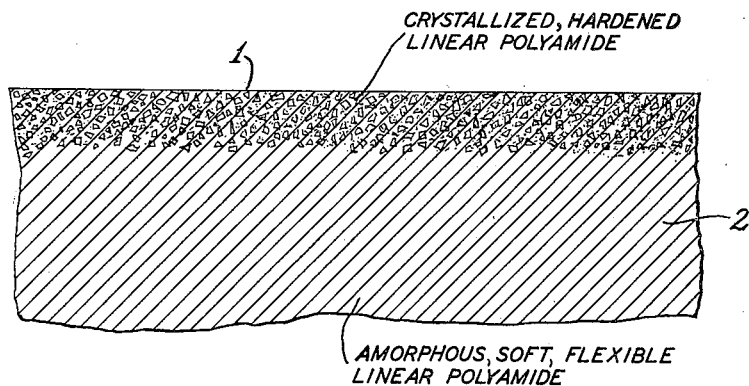

2,336,384

UNITED STATES PATENT OFFICE 2,336,384

SURFACE HARDENING OF LINEAR POLYAMIDE BODIES

William O. Baker, Morristown, and Norman R. Pape, Woodbridge, N. J., assignors to Bell Telephone Laboratories, Incorporated, New York, N. Y., a corporation of New York Application June 10, 1941, Serial No. 397,410

12 Claims. (Cl. 18—48)

This invention relates to hardening of polymeric bodies, and more particularly to the surface hardening of bodies formed of linear high molecular polyamides. Linear polyamides of the type contemplated by the invention have long chain linear molecules in general made up of divalent organic radicals connected together by linkages all or the predominant proportions of which are amide linkages. Such polyamides are in general formed by condensation of suitable bifunctional amide-forming reactants, such as diamines and dibasic acids, one or more amino acids, or equivalents of such substances. The bifunctional amide-forming reactants are condensed under such conditions that long chain linear molecules of high molecular weight are produced. The most useful polyamides have molecular weights which are quite high, being of the order of several thousand.

Linear polyamides at room temperature may be either amorphous, i. e., wholly or largely free of crystals, or crystalline, i. e., wholly or largely crystallized, depending in each case on the structure of the molecules and the heat treatment to which the polyamide was submitted. Because of their molecular structure certain amorphous linear polyamides cannot be crystallized. On the other hand, it is possible to produce in the amorphous state linear polyamides which are potentially crystalline, that is, which when properly heat-treated tend to become crystalline. By rapid cooling, as by quenching, of a polyamide which is potentially crystalline from the molten state it is possible to obtain a polyamide which at room temperature is of an amorphous nature. If the same polyamide is permitted to solidify slowly from the liquid state, as by slow cooling, it will become crystalline in character. It is also possible to convert an amorphous but potentially crystalline polyamide into a crystalline polyamide by heating it to a temperature below its melting point and holding it there for a suitable period. Such a polyamide, however, will be crystalline throughout its entire cross-section.

Most crystalline linear polyamides contain substantial proportions of both crystalline and amorphous phases, the small crystallites constituting the crystalline phase being haphazardly disposed in a matrix of amorphous material constituting the amorphous phase, unless of course the crystallites have been oriented by suitable means, as by cold drawing. The crystalline phase lends hardness to the polyamide; the amorphous phase lends toughness and flexibility to the polyamide. However, polyamides containing sufficiently large proportions of crystals to render them hard enough for many uses where at least moderate hardness is desirable are quite brittle and inflexible, and for this reason often undesirable. Polyamides which are sufficiently amorphous to have the desired toughness and flexibility for some purposes are quite soft and hence often undesirable. Quite often it is desirable that polyamides be flexible, tough, and hard but heretofore it has been impossible to obtain such a material. For example, even if molded polyamide bodies are formed of potentially crystalline polyamides they are usually amorphous since they are usually rapidly cooled by contact with the molding dies. Such bodies are therefore quite tough and flexible but quite soft. For many uses they are too soft since their surfaces are easily scratched or marred and their abrasion resistance is very low. When it is attempted to harden such bodies by heating them to cause the formation of crystals providing hardness, the bodies crystallize throughout and become brittle and inflexible.

The present invention overcomes these difficulties by providing polyamide bodies, and a process for producing such bodies, which are tough and flexible but yet quite hard. It accomplishes these results by providing linear polyamide bodies, and a process for producing them, which have a surface structure providing hardness and abrasion resistance and an interior structure providing flexibility and toughness. The present invention provides linear polyamide bodies having a crystallized surface in the region where hardness is desired and an interior which is amorphous of a considerably lower degree of crystallinity.

This will be more clearly apparent from the drawing in which is diagrammatically shown in cross section to a considerably enlarged scale a portion of a body of a polyamide embodying the invention. As shown in said drawing, the body 1 comprises an amorphous interior 2 containing only a small amount of or no crystals, and a substantially crystallized exterior layer extending inwardly from the surface of the body for a short distance which is considerably less than the thickness of the body. The crystallized surface portion lends hardness and abrasion resistance to the body while the amorphous interior renders it tough and flexible. The crystallized portion may extend over the entire surface of the body or be localized in any desired area.

The surface hardening is accomplished according to the present invention by subjecting the surface of an amorphous polyamide body to be hardened to an agent which will weaken or destroy the secondary bonds existing between the linear molecules of the polyamide tending to inhibit them from arranging themselves into crystal lattices, the agent being applied under conditions such that it will penetrate into the polyamide body for the desired depth to provide the desired depth of hardening. The agent is then substantially removed from the polyamide into which it has penetrated and the surface of the polyamide is heated until the treated portion is converted into a hard, crystalline material, the heating being such, however, as to cause little, if any, further crystallization of the interior of the polyamide body.

Polyamides which are capable of being so treated according to the invention contain long chain linear molecules made up of suitable divalent organic radicals connected by suitable linkages in the molecular chains, the predominant proportion, and advantageously all, of which linkages are primary amide linkages in that they contain —NH— groups. Such a polyamide, moreover, should have a molecular structure such that it is potentially crystalline, that is, capable of substantial crystallization even though it is initially in the amorphous state. Such an amorphous polyamide may be prepared by rapidly cooling or quenching from the melt a linear polyamide of such molecular structure that if the polyamide were cooled slowly it would be crystalline. Whatever crystallites are present in the polyamide before treatment according to the invention are advantageously unoriented. It is advantageous that the polyamide body be initially amorphous so that after its surface has been crystallized and hardened according to the invention the body as a whole is still tough and flexible.

In such polyamides hydrogen bonds exist between the hydrogen atoms of the —NH— groups of the primary amide linkages of the linear molecules and nitrogen or oxygen atoms in adjacent linear molecules. Such hydrogen bonds are the primary factors in stabilizing amorphous configurations of the linear molecules or segments thereof, and thus tend to keep the polyamide in the amorphous condition which it has been caused to assume by rapid cooling or quenching, even though it has a molecular structure such that it is potentially crystalline.

According to the present invention, there is applied to the surface of such a polyamide and caused to penetrate therein a non-aqueous hydrogen bonding agent of substantial hydrogen bonding strength which is stronger in this respect than the polyamide itself. Such an agent should be capable of uniformly penetrating into the polyamide body to diffuse into its linear molecules and at ordinary temperatures, or at the most at slightly elevated temperatures, form hydrogen bonds with such molecules to an extent sufficient substantially to replace the hydrogen bonds which said polyamide molecules have with each other, thus weakening or destroying the intermolecular hydrogen bonds. The small molecules of the hydrogen bonding agent which apparently become attached to the hydrogen bonding groups in the polyamide molecules not only weaken or destroy the intermolecular hydrogen bonds between the linear polyamide molecules but also apparently lubricate the rotation of the linear molecules into crystalline array. A wide variety of hydrogen bonding agents may be employed.

Such an agent should be in or be capable of being put in the fluid state, e. g. liquid or gaseous state, for ready penetrability into the polyamide body. The agent employed should not harmfully chemically react with the polyamide under the treating conditions. In general, any substance, liquid or gaseous, or capable of being put into either of these states, which has a marked solvent or swelling action on the polyamide and does not harmfully chemically react therewith during the treatment may be employed. Agents suitable for the invention may be made of two or more substances providing the necessary characteristics.

As examples of hydrogen bonding agents which may be employed according to the present invention are the phenols; substituted phenols such as o-chlorophenol; homologues of phenol, such as the cresols, carvacrol, and the xylenols; dihydric phenols, such as catechol, resorcinol, quinol and orcinol; and trihydric phenols, such as pyrogallol and phloroglucinol. Phenols of the above type which are not in liquid form may be employed in solutions. Either aqueous or organic solvents may be employed, although aliphatic alcohols may be very advantageously employed as solvents.

Mixtures of aliphatic alcohols and halogenated hydrocarbons, such as chloroform and ethanol, and tetrachloroethane and butanol, may also be employed. At somewhat elevated temperatures, agents such as formamide, propanol, isobutanol, amyl alcohol, and ethylene glycol may be employed to advantage, Organic acids, such as formic acid and acetic acid may also be employed. Inorganic acids, such as concentrated hydrochloric acid, concentrated nitric acid, or sulphuric acid may also be employed as hydrogen bonding agents, but care must be taken to remove them rapidly from the polyamides in order to prevent excessive hydrolysis.

The surface of a body of the polyamide is treated with the hydrogen bonding agent either by immersing the body in the liquid or gaseous agent if it is desired to harden the entire surface of the body or by applying the hydrogen bonding agent to a localized area on the body, if it is desired to harden only a portion of the surface of the body. Application of the hydrogen bonding agent may be done at ordinary temperatures or at elevated temperatures which are, however, preferably substantially below the melting point of the polyamide. Application of the agent may be made at ordinary or at elevated pressures. The time temperature and pressure of exposure of the polyamide to the hydrogen bonding agent may be so regulated as to obtain a penetration of the hydrogen bonding agent of from only a few mils to a distance of about a quarter of an inch or more, depending upon the thickness of the section of the polyamide body, but in any event substantially less than the thickness of the body. The depth of penetration of the hydrogen bonding agent determines the depth of crystallization, and hence the thickness of the layer of hardened polyamide, which will be obtained.

It is necessary to remove substantially all of the hydrogen bonding agent from the polyamide before the polyamide is heated to cause crystallization, since the presence of the hydrogen bonding agent appears to impede the formation of crystals having the desired hardness. Removal of the hydrogen bonding agent may be accomplished by various means, as by dissolving out the hydrogen bonding agent by a suitable solvent for it, by pumping out the hydrogen bonding agent, or, if the hydrogen bonding employed is quite volatile, by the application of heat to the polyamide body, or by a combination of such means.

It appears that immediately after the application and removal of the hydrogen bonding agent, the area in which it was applied usually becomes crystallized without heating. However, the hardness of such crystallized area is not greatly increased and indeed may be decreased. Apparently even though the addition and removal of the hydrogen bonding agent itself can cause crystallization it results in an expanded crystal lattice which results in softness of the polyamide. Subsequent mild heating of the treated polyamide surface according to the present invention, however, causes the formation of a crystalline polyamide structure which has considerably increased hardness, evidently due to "settling" of the lattices. The depth of the crystalline polyamide structure is, as indicated above, largely dependent upon the depth of penetration of the hydrogen bonding agent although the time and temperature of heating also govern. The temperature which it is necessary to employ in the heating is not critical, but should be great enough to volatilize the hydrogen bonding agent from the polyamide bonding if it is necessary in this manner to remove all or part of the hydrogen bonding agent. The heating temperature should be below the melting point of the polyamide, and is advantageously considerably below the melting point. Considerably elevated temperatures will cause crystallization of the interior portions of the polyamide which were not treated with the hydrogen bonding agent and thereby render the whole body brittle and inflexible. In general, temperatures of from about 50° C. to about 150° C. may be employed and in most cases a heating temperature of about 100° C. is advantageous to obtain the desired results. The duration of the heating is dependent upon the nature of the hydrogen bonding agent previously employed, upon the depth of penetration of the hydrogen bonding agent and the consequent thickness of hard, crystallized polyamide which it is desired to obtain, and upon the temperature employed. In general a fairly short time of heating is employed, ranging from about one minute to about thirty minutes. In a given case the heating is continued until the desired hardness is obtained for the depth of crystallization of the polyamide.

X-ray diffraction patterns of portions of an initially amorphous polyamide body of the invention taken from the untreated interior thereof and from the treated exterior portion thereof indicate that the portion of the polyamide body near the treated surface thereof is considerably crystallized while the inner portions of the body are amorphous, having little or no crystallinity both before and after treatment. Tests performed upon polyamide bodies surface hardened according to the present invention have indicated that it is possible to obtain a considerable increase in surface hardness and a correspondingly great increase in Young's modulus of elasticity of such surface. For example, polyamide bodies which according to the invention have been treated with cresol as the hydrogen bonding agent and heated for a short period according to the invention show as high as a 60 per cent increase in the Pfund hardness and as much as 200 per cent increase in Young's modulus.

The following illustrative examples indicate the preparation of bodies embodying the present invention, and methods of obtaining said bodies. The Pfund hardness mentioned in the examples is a well recognized standard for indicating the hardness of the surface of a sample and is a function of the diameter of a non-permanent depression made in the sample by a quartz ball of predetermined size pressed into the sample at a predetermined pressure. Higher hardnesses result in smaller depression diameters and hence in smaller hardness numbers. Young's modulus of elasticity for the surface of the sample may be determined in a similar manner, being calculated from the depth and diameter of the impression made by the ball as described by Larrick in the Bulletin of the American Physical Society (67) vol. 14, page 17, (1937). Although in each of the examples are given both the Pfund hardness and Young's modulus of elasticity before and after treatment according to the invention, the increase in the modulus of elasticity provides a more accurate measure of the increase in surface hardness as a result of the treatment than does the change in the Pfund hardness numbers.

*Example 1*

A slab of a suitable polyhexamethylene sebacamide about one-eighth inch thick was prepared by quenching a suitably shaped body of said polyamide from the melt. X-ray examination of the structure of the slab indicated that it was highly amorphous in character throughout. It was fairly flexible. In this state its surface had a Pfund hardness of approximately 6.0 and Young's modulus of elasticity of approximately $1.3 \times 10^9$ dynes per square centimeter, indicating that the material was quite soft. The slab was quite flexible. The slab was immersed in cresol, a solvent for the polyamide, for about fifteen minutes at a temperature of approximately 25° C., its surface being then rinsed with chloroform to remove most of the cresol. The residual cresol was pumped out of the slab at room temperature for about forty-nine hours, the slab being disposed in an evacuation chamber for the purpose. Examination of the structure of the slab at this stage with X-rays indicated that the structure of the interior portion thereof remained unchanged by the treatment but that the portions thereof adjacent the surfaces of the slab were highly crystallized, each of the crystallized surface layers being about 0.01 inch thick. However, the surface hardness and surface modulus of elasticity of the polyamide slab at this stage remained unchanged. The slab was then heated in air at about 100° C. for about thirty minutes. X-ray examination of the interior and surface portions of the slab resulted in diffraction patterns no different from the patterns obtained from examination of similar portions of the slabs after treatment with the cresol but before heating. However, the hardness of the surfaces of the slab increased so that the Pfund hardness reading was about 5.3 while the modulus of elasticity was about $2.1 \times 10^9$ dynes per square centimeter, a 67 per cent increase. The resulting slab was tough and flexible and had a fairly hard surface which did not become readily scratched or marred and which had good resistance to abrasion.

Example 2

In this example, a quenched, initially amorphous fairly flexible slab approximately one-eighth inch in thickness of polyhexamethylene sebacamide was again employed. The slab was exposed for ten minutes to cresol vapor at approximately 100° C., after which it was dipped in cresol. The residual cresol solvent was pumped out of the slab before it was heated. The slab was then heated at about 100° C. for twenty minutes. X-ray examination of the finished slab revealed that the interior of the slab retained its amorphous structure while the portions of the slab immediately adjacent the surfaces thereof were highly crystallized, each of the crystallized layers being about 0.02 inch thick. The hardness of the surface of the slab increased considerably as was evidenced by the fact that the Pfund hardness of the original slab was approximately 6.0 while the Pfund hardness of the surface hardened slab was approximately 5.0, and by the fact that the modulus of elasticity of the surface of the slab increased from approximately $1.3 \times 10^9$ dynes per square centimeter, to approximately $2.5 \times 10^9$ dynes per square centimeter, a 90 per cent increase. The slab as a whole, however, was tough and flexible.

Example 3

In this example, a 100 mils thick sheet of polydecamethylene sebacamide was treated according to the invention. The linear polyamide of which the sheet was formed had been quenched, and so was quite flexible and amorphous throughout its cross section, as was evidenced by its X-ray diffraction pattern. The surfaces of the sheet had an initial Pfund hardness of about 7.1 and a Young's modulus of about $0.8 \times 10^9$ dynes per square centimeter. It was immersed in cresol at about 25° C. for about ten minutes, after which its surfaces were rinsed with chloroform to remove the greater proportion of the cresol. The residual cresol was substantially removed from the sheet by evacuation at room temperature. The sheet was then heated at about 100° C. in air for about twenty minutes, after which its surfaces were found to be of a crystalline structure of a considerably increased hardness, as indicated by their Pfund hardness of about 6.2 and Young's modulus of about $1.2 \times 10^9$ dynes per square centimeter, a 50 per cent increase. Examination of the cross section of the sheet showed that the sheet had a thin crystalline layer about 10 mils thick at each of its opposite surfaces, while its interior remained amorphous. The finished sheet was tough and quite flexible.

Example 4

A flexible sheet about 50 mils thick of polyhexamethylene adipamide was employed in this case. The sheet, which had been quenched, was initially of amorphous structure, its surfaces having a Pfund hardness of about 5.4 and a Young's modulus of $2.0 \times 10^9$ dynes per square centimeter. The sheet was dipped in cresol at about 25° C. for about seven minutes, after which its surfaces were rinsed off with chloroform. The residual cresol was substantially completely removed by evacuation at room temperature, after which the sheet was heated in air to a temperature of about 100° C. for about twenty-five minutes. The initially amorphous sheet became crystalline at each of its surfaces for a depth of about 15 mils, the interior of the sheet remaining in the amorphous state. The surface hardness of the sheet was considerably increased since the surface of the sheet indicated a Pfund hardness of about 4.7 and a Young's modulus of $3.0 \times 10^9$ dynes per square centimeter, a 50 per cent increase. Despite such increase in surface hardness the sheet did not become appreciably less flexible.

Example 5

A flexible sheet of polyhexamethylene adipamide which was about 50 mils thick but less well quenched than that of Example 4, so that it contained less amorphous matter, was treated in this example. The sheet had a surface Young's modulus of elasticity of about $3.0 \times 10^9$ dynes per square centimeter and a surface hardness of about 4.7 on the Pfund scale before treatment according to the invention. The sheet was dipped into cresol at about 25° C. for about fifteen minutes and was evacuated at room temperature for about twenty hours, after which it was heated in air at about 80° C. for two hours. The greatly increased surface hardness of the sheet after such treatment was indicated by the Young's modulus of elasticity of the surface of $10.6 \times 10^9$ dynes per square centimeter, an increase of over 210 per cent and by the Pfund hardness of 3.0. Despite such large increase in surface hardness, however, the sheet was flexible after the treatment. It was also tough and its surface had good abrasion resistance.

In each of the above cases the finished polyamide of the invention although having a somewhat more rigid, considerably hardened surface than the untreated polyamide, is still as a whole flexible and tough.

The present invention relates to potentially crystalline linear polyamides of various kinds. Thus, the divalent organic radicals, connected together to form linear molecules by molecular chain linkages at least about half of which are primary amide linkages, may be linear or cyclic and may contain hetero atoms. While it is preferable that all of the amide linkages in the molecular chain connecting such divalent radicals be primary amide linkages, the present invention may also be applied to linear polyamides in which some of the amide linkages are derived from secondary diamines. In such a secondary amide linkage the nitrogen has no hydrogen connected to it capable of providing a hydrogen bond. Such a linkage will also provide a smaller crystallizing force in the polyamide than an amide linkage having a hydrogen attached to the nitrogen. The present invention, however, may be applied to polyamides containing a substantial proportion of such secondary amide linkages. No more than about 25 per cent of the linkages in the molecular chain, however, should be of such type; otherwise, the surface crystallinity providing the desired surface hardness may not be obtained. It is also possible to employ linear polyamides containing a substantial proportion of ester linkages in the molecular chain. The ester linkages provide some forces which tend to promote crystallization, although not to as great an extent as primary amide linkages, so that a linear polyamide containing ester linkages and treated according to the present invention should have at least about 50 per cent of the linkages in the linear molecular chains as primary amide linkages. Under suitable conditions it is possible to practice the invention in connection with linear polyamides containing in addition to the primary amide linkages still other types of linkages in the molecular chains or two or more linkages other than primary amide linkages, providing that in any such polyamide at least about 50 per cent of the linkages in the molecular chain are primary amide linkages and the polyamide is potentially crystallizable even though initially amorphous. The most advantageous results are provided, however, when linear polyamides are employed according to the invention in which the divalent organic radicals are straight saturated hydrocarbon chains and the linkages connecting them are all primary amide linkages.

It is further important that the linear polyamides treated according to the present invention have a molecular weight of sufficient magnitude to provide the necessary relation of potentially crystalline and amorphous phases. Polyamides treated according to the present invention should for this reason have a molecular weight corresponding to an intrinsic viscosity of at least about 0.6. The intrinsic viscosity may be determined from the formula $$V_i = \frac{\log_e V}{C}$$

where V is the viscosity of a fairly dilute solution of the polymer divided by the viscosity of the solvent, such as cresol, in the same units and at the same temperature, and C is the concentration in grams of the polymer per 100 cc. of the solution. In crystalline linear polyamides an intrinsic viscosity of this magnitude indicates a molecular weight somewhat above which cold drawing begins. Each of the polyamides in the above examples had a molecular weight corresponding to an intrinsic viscosity of about 0.6 in cresol.

The present invention thus provides articles having hard surface and a tough flexible interior so that the article as a whole has the properties of hardness, toughness and flexibility. The invention is particularly useful in the production of articles, such as molded articles, having hard surfaces resistant to marring, scratching and abrasion, and the properties of toughness and flexibility. The invention is also advantageous in the production of articles in which shape fidelity, especially on intricately molded surfaces, is desired. The present invention, for example, is useful in the production of phonograph records since it makes possible a hard surface containing a wear resistant sound track with a tough, flexible body portion which will resist breakage. Polyamide articles of the present invention are also useful in connections where it is desirable to resist cold flow. For example, because of their resistance to mold flow polyamide insulators embodying the invention are useful in closely adjusted contact systems in which a large number of makes and breaks occur. Under such conditions, cold flow would result in insulators of unhardened material, with consequent loss of adjustment of the system. For similar reasons, polyamide articles embodying the invention are advantageous for uses where they are exposed to friction and pressure, as in bearings, bushings, or the like.

It is apparent that various modifications may be made in the methods and articles described above and that the present invention may be employed for purposes other than those indicated. In the appended claims, the term "linear polyamide" is intended to include besides linear polyamides per se having all their amide linkages containing —NH— groups, polyamides containing other kinds of linkages as indicated above.

It is intended that the patent shall cover by suitable expression in the appended claims whatever features of patentable novelty reside in the invention.

What is claimed is:

1. The method of surface hardening a polyamide body comprising exposing the surface to be hardened of a body of a linear potentially crystalline polyamide to a fluid agent chosen from the class consisting of non-aqueous solvents for said polyamide and non-aqueous swelling agents for said polyamide, said fluid agent being applied to said polyamide under conditions such that said agent penetrates said polyamide body for a distance less than the thickness of said body to cause a portion of said body to remain untreated, removing substantially all of said agent applied to said polyamide body, and thereafter exposing said surface of said polyamide body to heat of a temperature below the melting temperature of said polyamide until said surface hardens due to crystallization.

2. The method of surface hardening a polyamide body comprising exposing the surface to be hardened of a body of potentially crystalline polyamide having linear molecules made up of aliphatic divalent radicals linked together by primary amide linkages to a fluid agent chosen from the class consisting of non-aqueous solvents for said polyamide and non-aqueous swelling agents for said polyamide, said fluid agent being applied to said polyamide under conditions such that said agent penetrates said polyamide body for a distance less than the thickness of said body to cause a portion of said body to remain untreated, removing substantially all of said agent applied to said polyamide body, and thereafter exposing said surface of said polyamide body to heat of a temperature below the melting temperature of said polyamide until said surface hardens due to crystallization.

3. The method of surface hardening a polyamide body comprising exposing the surface to be hardened of an amorphous body of a linear potentially crystalline polyamide having a molecular weight corresponding to an intrinsic viscosity of at least about 0.6 to a fluid agent chosen from the class consisting of non-aqueous solvents for said polyamide and non-aqueous swelling agents for said polyamide, said agent being applied to said polyamide body under conditions such that said agent penetrates said polyamide body for a distance less than the thickness of said body to cause a portion of said body to remain untreated, removing substantially all of said agent applied to said polyamide body, and thereafter exposing said surface of said polyamide body to heat of a temperature substantially below the melting temperature of said polyamide until said surface hardens due to crystallization.

4. The method of surface hardening a polyamide body comprising exposing the surface to be hardened of a body of a linear potentially crystalline polyamide to a fluid agent having a solvent action on the polyamide, said fluid agent being applied to said polyamide body under conditions such that said agent penetrates said polyamide body for a distance less than the thickness of said body to cause a portion of said body to remain untreated, removing substantially all of said agent applied to said polyamide body, and thereafter exposing said surface of said polyamide body to heat of a temperature below the melting temperature of said polyamide until said surface hardens due to crystallization.

5. The method of surface hardening a polyamide body comprising exposing the surface to be hardened of an amorphous body of a linear potentially crystalline polyamide to a fluid agent which has a solvent action on the polyamide, which is non-reactive with said polyamide, and which is capable of penetrating into said polyamide body, said agent being applied to said polyamide body under conditions such that said agent penetrates said polyamide body for a distance less than the thickness of said body to cause a portion of said body to remain untreated, removing substantially all of said fluid agent applied to said polyamide body, and thereafter exposing said surface of said polyamide body to heat of a temperature substantially below the melting temperature of said polyamide until said surface hardens due to crystallization.

6. The method of surface hardening a polyamide body comprising exposing the surface to be hardened of an amorphous body of a linear potentially crystalline polyamide having a molecular weight corresponding to an intrinsic viscosity of at least about 0.6 to a fluid agent having a solvent action on the polyamide and capable of penetrating into said polyamide body, said agent being applied to said polyamide body under conditions such that said agent penetrates said polyamide body for a distance less than the thickness of the body to cause a portion of said body to remain untreated, removing substantially all of said agent applied to said polyamide body, and thereafter exposing said surface of said polyamide body to heat of a temperature substantially below the melting point of said polyamide until said surface hardens due to crystallization.

7. The method of surface hardening a polyamide body comprising exposing the surface to be hardened of a body of a linear potentially crystalline polyamide to a non-aqueous fluid agent having a swelling action on the polyamide, said fluid agent being applied to said polyamide body under conditions such that said fluid agent penetrates said polyamide body for a distance less than the thickness of said body to cause a portion of said body to remain untreated, removing substantially all of said agent applied to said polyamide body, and thereafter exposing said surface of said polyamide body to heat of a temperature below the melting temperature of said polyamide until said surface hardens due to crystallization.

8. The method of surface hardening a polyamide body comprising exposing the surface to be hardened of an amorphous body of a linear potentially crystalline polyamide to a non-aqueous fluid agent which has a swelling action on the polyamide and which is non-reactive with said polyamide, said agent being applied to said polyamide body under conditions such that said agent penetrates said polyamide body for a distance less than the thickness of the body to cause a portion of said body to remain untreated, removing substantially all of said fluid agent applied to said polyamide body, and thereafter exposing said surface of said polyamide body to heat of a temperature substantially below the melting point of said polyamide until said surface hardens due to crystallization.

9. The method of surface hardening a polyamide body comprising exposing the surface to be hardened of an amorphous body of a linear potentially crystalline polyamide having a molecular weight corresponding to an intrinsic viscosity of at least about 0.6 to a non-aqueous fluid agent having a swelling action on the polyamide, said agent being applied to said polyamide body under conditions such that said agent penetrates said polyamide body for a distance less than the thickness of the body to cause a portion of said body to remain untreated, removing substantially all of said agent applied to said polyamide body, and thereafter exposing the surface of said polyamide body to heat of a temperature substantially below the melting temperature of said polyamide until said surface hardens due to crystallization.

10. A linear polyamide body of substantial cross-sectional thickness having a relatively soft amorphous interior and an integral surface layer which is relatively hard and crystalline.

11. A body of substantial cross-sectional thickness formed of a linear polyamide having linear molecules made up of aliphatic divalent radicals linked together by primary amide linkages, said body having an amorphous interior and a harder crystalline surface.

12. The method of surface hardening a polyamide body comprising exposing the surface to be hardened of a body of a linear potentially crystalline polyamide to cresol under conditions such that the cresol penetrates said polyamide body for a distance less than the thickness of said body to permit a portion of said body to remain untreated, removing substantially all of said cresol applied to said polyamide body, and thereafter exposing said surface of said polyamide body to heat of a temperature below the melting temperature of said polyamide until said surface hardens due to crystallization.

WILLIAM O. BAKER.
NORMAN R. PAPE.